United States Patent [19]
Steinberger et al.

[11] Patent Number: 5,567,060
[45] Date of Patent: Oct. 22, 1996

[54] DIFFERENTIAL GEARING FOR AN AUTOMOTIVE VEHICLE

[75] Inventors: Wolfgang Steinberger, Herzogenaurach; Rudolf Folk, Burghaslach; Reinhart Malik, Herzogenaurach, all of Germany

[73] Assignee: Ina Walzlager Schaeffler KG, Germany

[21] Appl. No.: 385,314

[22] Filed: Feb. 8, 1995

[30] Foreign Application Priority Data

Feb. 28, 1994 [DE] Germany ................. 9403308 U

[51] Int. Cl.⁶ .................................... F16C 19/46
[52] U.S. Cl. ............................ 384/569; 384/581
[58] Field of Search .................. 384/563, 517, 384/518, 569, 513, 581, 535

[56] References Cited

U.S. PATENT DOCUMENTS

| | | | |
|---|---|---|---|
| 4,023,868 | 5/1977 | Miki | 384/563 |
| 4,033,644 | 7/1977 | Reneerkens | 384/563 |
| 5,322,374 | 6/1994 | Takata | 384/563 |

*Primary Examiner*—Lenard A. Footland
*Attorney, Agent, or Firm*—Bierman & Muserlian

[57] ABSTRACT

A differential gearing comprising a differential case (2) mounted in a gearbox casing (1) and connected via a crown wheel (6) to a drive pinion (4) of a third motion shaft (5), axle shafts (9) being mounted in the differential case (2), characterized in that the axle shafts (9) are mounted in the differential case (2) on a clearance-free or pre-tensioned rolling bearing (11).

11 Claims, 3 Drawing Sheets

DIFFERENTIAL GEARING FOR AN AUTOMOTIVE VEHICLE

STATE OF THE ART

A differential gearing comprising a differential case mounted in a gearbox casing and connected via a crown wheel to a drive pinion of a third motion shaft, axle shafts being mounted in the differential case is known to assure that the drive wheels of each axle shaft can roll free of slip in curves despite differing rotational speeds. A third motion shaft or a cardan shaft drives a crown wheel via a drive pinion, the crown wheel being connected rotationally fast to the housing or differential case in which differential side gears and differential pinions are mounted. During straight-ahead driving, these differential pinions are at rest relative to the differential case so that both axle shafts rotate at the same speed as the crown wheel. When driving in curves, the two axle shafts rotate at different speeds. The differential pinions then rotate and effect that the increase in the rotational speed of the one axle shaft relative to the speed of the crown wheel is of the same magnitude as the decrease in rotational speed of the other axle shaft relative to the crown wheel.

Such a differential gearing is shown, for example, in FIG. 7.23 of the technical book: "Zahnradgetriebe, Grundlagen und Konstruktion der Vorgelege- und Planetenradgetriebe" by Johannes Looman published by Springer Publishers, Berlin Heidelberg New York 1970. The axle shafts of this differential gearing case are slide-mounted. The disadvantage of such a slide mounting is that, due to the mounting clearance required, disturbing noises are caused. Depending on the type of vehicle concerned, these can be "droning" or "booming" noises. It is indeed possible to obtain a clearance-free adjustment of such a slide bearing by bracing the shaft against the housing by means of a spring and a friction cone but then, higher friction and higher wear have to be accepted.

OBJECTS OF THE INVENTION

It is an object of the invention to mount the axle shafts in a differential gearing so that in spite of a clearance-free adjustment, no increased friction and thus also no increased wear occurs.

This and other objects and advantages of the invention will become obvious from the following detailed description.

THE INVENTION

The novel differential gearing of the invention comprises a differential case (2) mounted in a gearbox casing (1) and connected via a crown wheel (6) to a drive pinion (4) of a third motion shaft (5), axle shafts (9) being mounted in the differential case (2), characterized in that the axle shafts (9) are mounted in the differential case (2) on a clearance-free or pre-tensioned rolling bearing (11).

Because the axle shafts are mounted in the differential case on a clearance-free or pre-tensioned rolling bearing, the aforementioned noises are effectively avoided by this type of mounting.

In a further modification of the invention, the axle shafts are mounted in a thin-walled needle roller bush with uniform wall thickness whose raceway, when seen in cross-section, comprises in at least one peripheral region, an elastically yielding convexity which deviates from its circular shape whereby the axle shafts are radially pre-tensioned between the raceway convexity and an opposite raceway by at least one needle roller.

Due to this shape deviation from circularity, a defined pre-tension can be applied to the shaft so that the shaft is mounted free of clearance, or has only a restricted possibility of self-movement so that the extremely unpleasant noises mentioned above cannot be generated. This means that the elastic properties of the raceway convexities have to be determined so that a sufficiently high pre-tension on the axle shaft is obtained while a small self-movement of the axle shaft is possible at the same time when the raceway convexities are pressed towards the inner wall of the differential case.

According to another embodiment of the invention, this pre-tension can also be obtained if the raceway of the needle roller bush, when seen in longitudinal cross-section, comprises in at least one peripheral region, an elastically yielding convexity pointing towards the center of the bearing.

The magnitude of the pre-tension applied to the shaft is determined by the constitutive material of the needle roller bush and its wall thickness. The larger the wall thickness of the material used, the larger is the pre-tension exerted on the axle shaft. The elastically of the steel materials generally used is also influenced by their hardening. This means that the pre-tension of the axle shaft is greater in the case of a hardened steel than in an unhardened steel. The degree of elasticity also depends on the number of peripheral regions of the needle roller bush which comprise a raceway convexity deviating from circularity. Advantageously, three peripheral regions of the needle roller bush, offset at 120° to one another, comprise raceway convexities. By this, it is obtained that the shaft is uniformly pre-tensioned from all sides which means that it can execute self-movements only if the given elasticity of the needle roller bush in the regions of the raceway convexities is neutralized.

According to another embodiment of the invention, the needle roller bush comprises a slit at one point of its periphery. By this, the adaptability of the bush to the geometry of the receiving bore is improved, i.e. an expensive fine finishing of this reception bore is not required.

According to a further characteristic of the invention, the cage comprises at one point of its periphery, an axially extending slit formed by mutually facing end surfaces thereof. This results in the cage being pressed under elastic tension against the rolling elements whereby it presses these rolling elements against the outer raceway. To further increase the pre-tension of the cage, the invention also provides for a spring element to be arranged between the end surfaces of the cage.

Finally, according to a further embodiment of the invention, the pre-tension on the axle shafts can also be obtained by inserting a ring between the needle rollers and the inner peripheral surface of the needle roller bush, the raceway of the ring comprising in at least one peripheral region, an elastically yielding convexity which deviates from its circular shape. The needle roller bush in this case can be made of steel or, to improve damping action, of a polymeric material.

Radially pre-tensioned rolling bearings in which at least one raceway comprises, in at least one peripheral region, a convexity deviating from its circular shape have been known for a long time. Such needle roller bearings are described for example in DE-GM 19 78 056, DE-GM 69 33 767 and DE-OS 27 41 057. However, none of these prior art documents contain any suggestions as to the possible use of a needle roller bearing pre-tensioned in this manner in a differential gearing with the aim of avoiding the so-called "droning" or "booming" noises. The aim of previous developments was much rather to obtain exact centering with the help of the rolling bearings. These pre-tensioned needle roller bearings are used for example as steering column bearings or for the mounting of shafts in electric motors.

BRIEF DESCRIPTION OF THE DRAWINGS

Referring now to the drawings.

Figure 1:
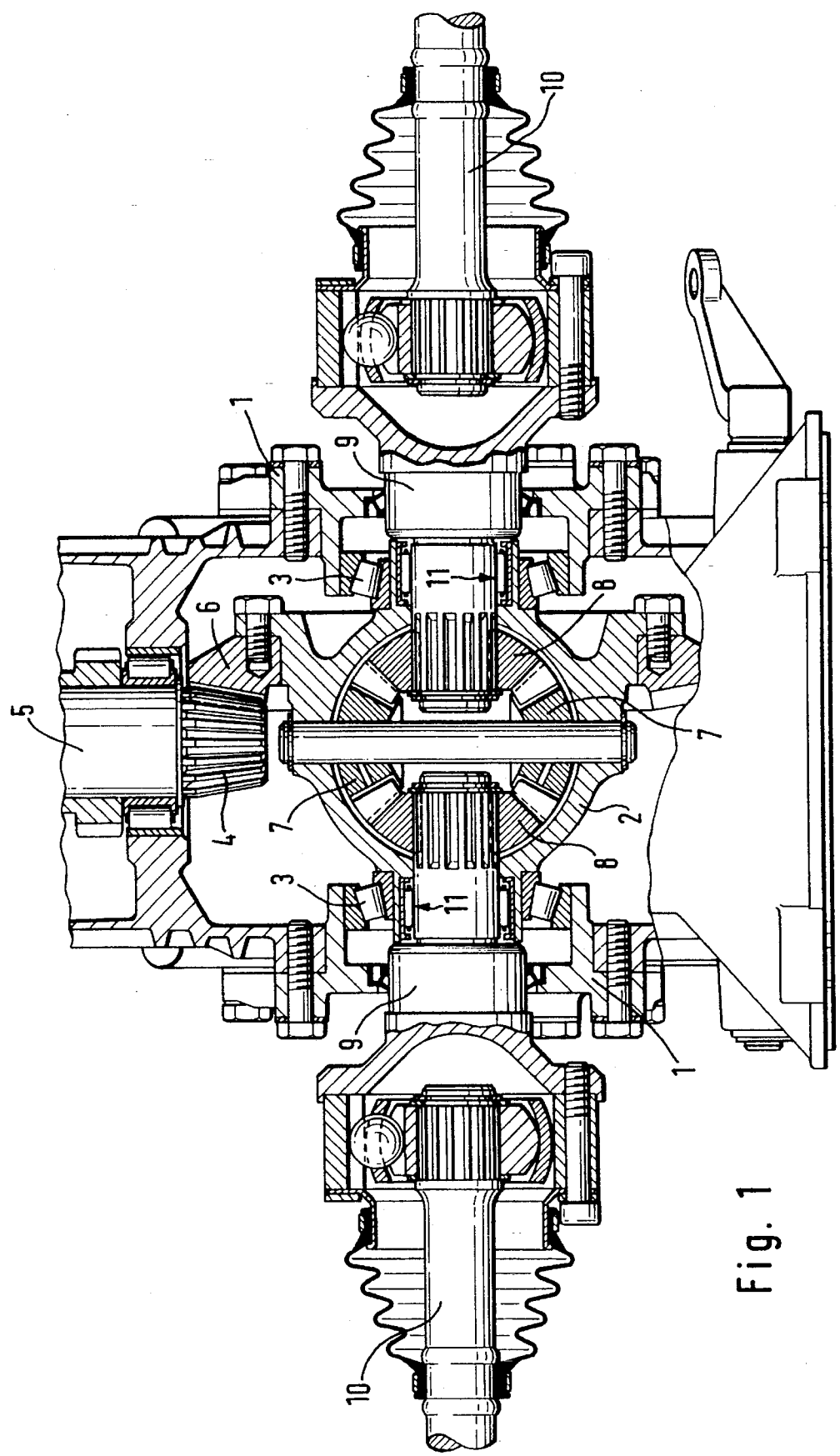
FIG. 1 is a longitudinal cross-section through a differential gearing of a passenger car.

The differential gearing of an automotive vehicle represented in FIG. 1 comprises a casing (1) in which a differential case (2) is mounted on two tapered roller bearings (3). A drive pinion (4) of a third motion shaft (5) drives a crown wheel (6) which in turn sets the differential case (2) in motion. The differential case (2) is connected via differential gears (7) and driving gears (8) to axle shafts (9) which drive wheels, not shown, via propeller shafts (10).

Figure 2:
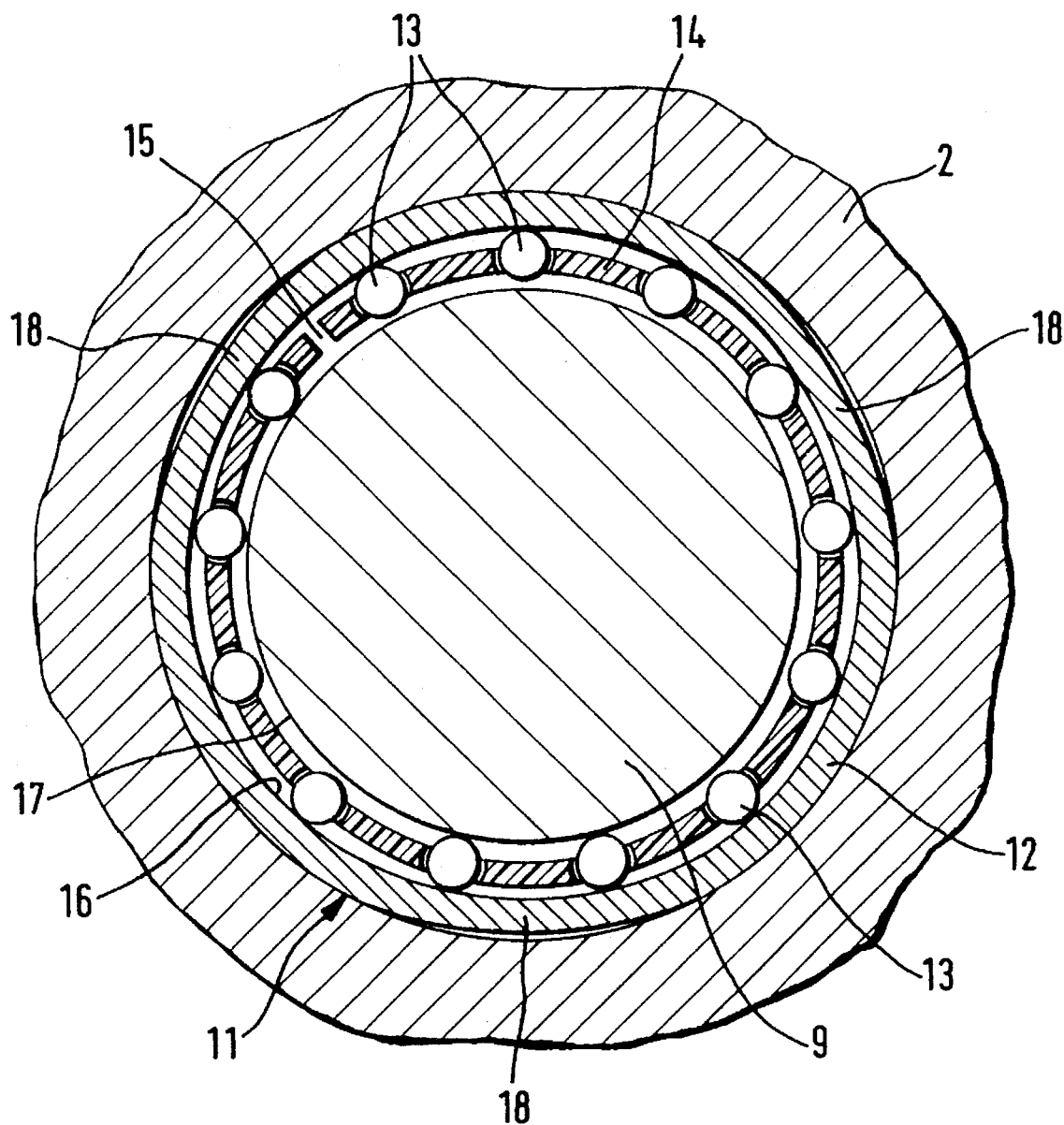
FIG. 2 is a cross-section through a needle roller bush arranged between a differential case and a flanged shaft mounted therein.

The axle shafts (9) are mounted in the differential case (2) with the help of needle roller bearings (11) comprising, as can be seen in FIG. 2, a needle roller bush (12) and needle rollers (13) guided axially parallel by means of a cage (14). At one point of its periphery, the cage (14) comprises an axial through-slit (15). The needle rollers (13) roll on raceways (16) and (17) formed respectively on the inner peripheral surface of the bush (12) and on a part of the peripheral surface of the axle shaft (9). Three peripheral regions of the needle roller bush (12), offset at 120° to one another, comprise raceway convexities (18). These raceway convexities (18) yield elastically in a radical direction so that the axle shafts (9) are firmly pre-tensioned in three peripheral regions because the needle rollers (13) bear both against the inner raceway (17) and the outer raceway (16), while a self-movement of the axle shafts (9) is possible at the same time by an overcoming of the elasticity originating from the raceway convexities (18). The arrangement of the axle shafts (9) in a differential gearing of an automotive vehicle as provided by the invention effectively prevents the so-called "droning" or "booming" noises of hitherto used slide bearings.

Figure 3:
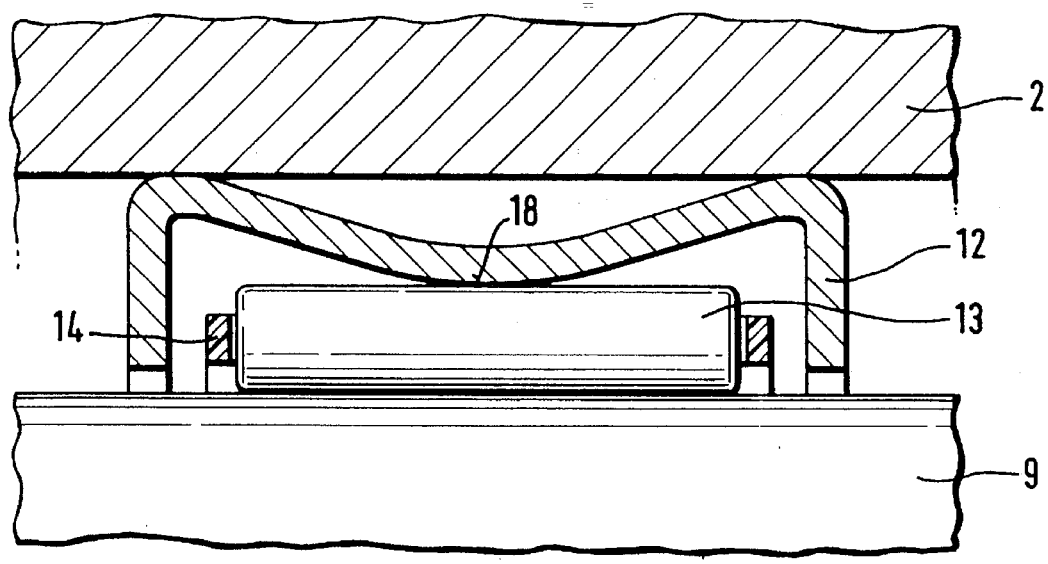
FIG. 3 is a partial longitudinal cross-section through a needle roller bush.

In the longitudinal cross-section of FIG. 3, the pre-tension on the axle shaft (9) is obtained by the raceway convexity (18) of the needle roller bush (12) whose vertex is advantageously arranged at the center. This raceway convexity (18) can extend over the entire circumference of the needle roller bush (12), i.e. through 360°, or only over a part of the circumference. Advantageously, in this case too, the axle shaft is pre-tensioned in three regions offset at 120°.

Figure 4:
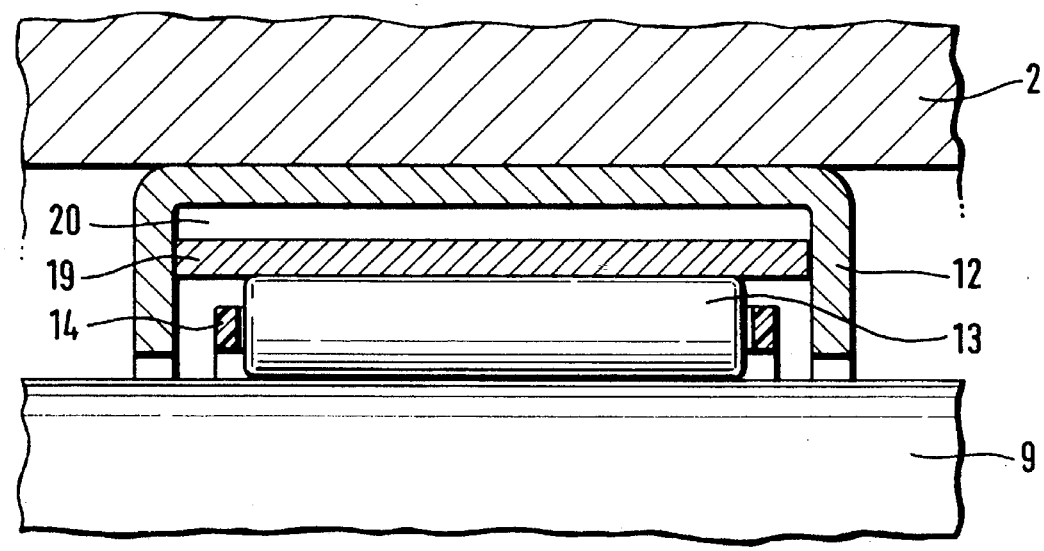
FIG. 4 is a partial longitudinal cross-section through a needle roller bush with an inserted ring.

In FIG. 4, it can be seen that the pre-tension on the axle shaft (9) is exerted by a ring (19) arranged between the inner peripheral surface of the needle roller bush (12) and the needle rollers (13). Due to the fact that the raceways of the ring (19) comprise an elastically yielding convexity deviating from their circular shape in at least one peripheral region, a gap (20) is formed at this point between the ring (19) and the inner peripheral surface of the needle roller bush (12). Depending on the intended use, the needle roller bush (12) of this embodiment can be made of steel, or for improving damping, of polymeric material.

Various modifications of the differential gearing of the invention may be made without departing from the spirit or scope thereof. It is to be understood that the invention is intended to be limited only as defined by the appended claims.

What we claim is:

1. A differential gearing comprising a differential case (2) mounted in a gearbox casing (1) and connected via a crown wheel (6) to a drive pinion (4) of a third motion shaft (5), axle shafts (9) being mounted in the differential case (2) on a clearance-free or pre-tensioned rolling bearing (11), characterized in that the axle shafts (9) are mounted in a thin-walled needle roller bush (12) of uniform wall thickness whose raceway (16) when seen in cross-section, comprises in at least one peripheral region, an elastically yielding convexity (18) which deviates from a circular shape of the raceway so that the axle shafts (9) are radially pre-tensioned between the raceway convexity (18) and an opposite raceway (17) by at least one needle roller (13).

2. A differential gearing of claim 1 wherein the raceway (16) of the needle roller bush (12) comprises raceway convexities (18) in three peripheral regions offset at 120° to one another.

3. A differential gearing of claim 1 wherein the needle roller bush (12) comprises a slit at one peripheral point thereof.

4. A differential gearing of claim 1 wherein a cage (14) of the bearing (11) comprises, at one peripheral point, an axially extending slit (15) formed by mutually facing end surfaces of the cage (14).

5. A differential gearing of claim 4 wherein the end surfaces of the cage (14) are retained under pre-tension by a spring element.

6. A differential gearing comprising a differential case (2) mounted in a gearbox casing (1) and connected via a crown wheel (6) to a drive pinion (4) of a third motion shaft (5), axle shafts (9) being mounted in the differential case (2) on a clearance-free or pre-tensioned rolling bearing (11), characterized in that the axle shafts (9) are mounted in a thin-walled needle roller bush (12) of uniform wall thickness whose raceway (16) when seen in longitudinal cross-section, comprises in at least one peripheral region, an elastically yielding convexity (18) pointing towards a center of the bearing (11) so that the axle shafts (9) are radially pre-tensioned between the raceway convexity (18) and an opposite race (17) by at least one needle roller (13).

7. A differential gearing of claim 6 wherein the raceway (16) of the needle roller bush (12) comprises raceway convexities (18) in three peripheral regions offset at 120° C. to one another.

8. A differential gearing of claim 6 wherein the needle roller bush (12) comprises a slit at one peripheral point thereof.

9. A differential gearing of claim 6 wherein a cage (14) of the bearing (11) comprises, at one peripheral point, an axially extending slit (15) formed by mutually facing end surfaces of the cage (14).

10. A differential gearing of claim 9 wherein the end surfaces of the cage (14) are retained under pre-tension by a spring element.

11. A differential gearing comprising a differential case (2) mounted in a gearbox casing (1) and connected via a crown wheel (6) to a drive pinion (4) of a third motion shaft (5), axle shafts (9) being mounted in the differential case (2) on a clearance-free or pre-tensioned rolling bearing (11), characterized in that the axle shafts (9) are mounted in a thin-walled needle roller bush (12) of uniform wall thickness comprising needle rollers (13), a ring (19) being arranged between the needle rollers (13) and an inner peripheral surface of the needle roller bush (12), and a raceway of the ring (19) comprises, in at least one peripheral region, an elastically yielding convexity (18) which deviates from a circular shape of said raceway.

* * * * *